S. P. PIERSON.
AUTOMOBILE STEERING GEAR.
APPLICATION FILED AUG. 10, 1917.
1,272,085.
Patented July 9, 1918.
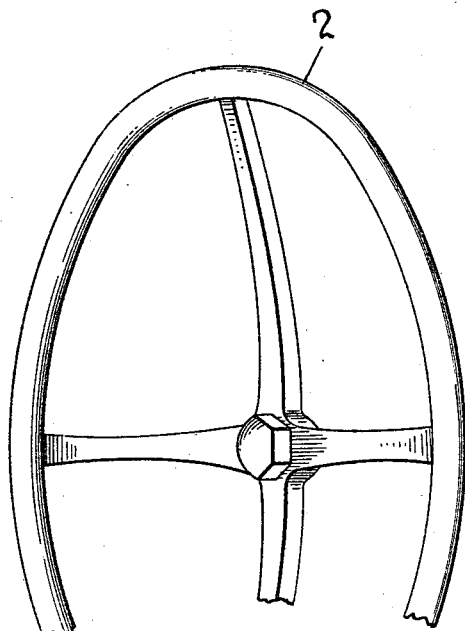
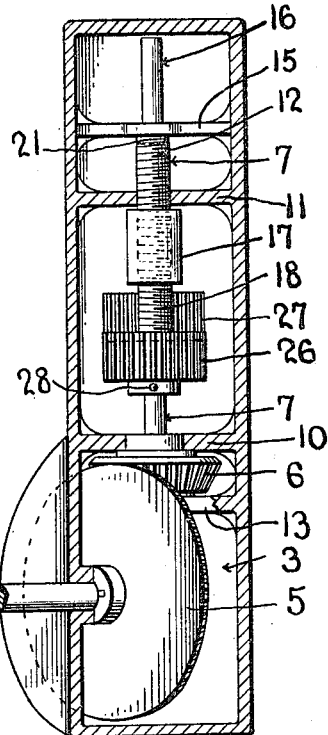
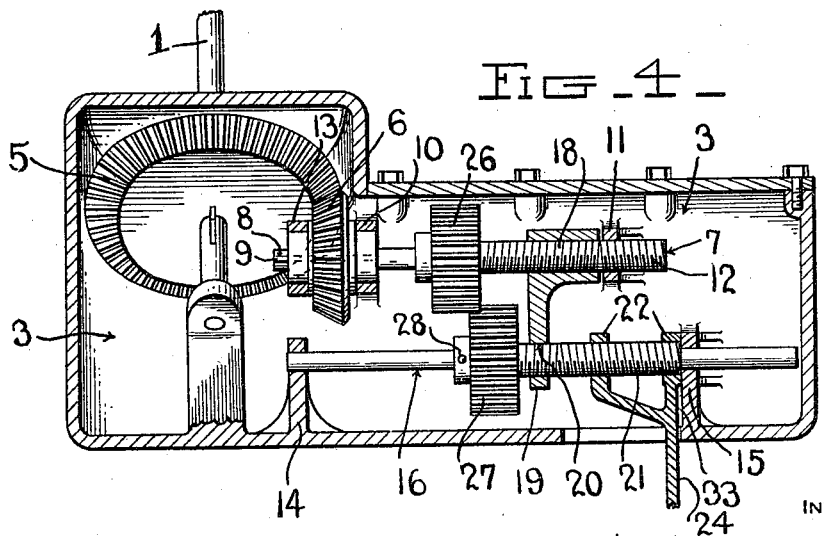
INVENTOR
S. P. Pierson
WITNESSES
BY *Victor J. Evans*
ATTORNEY

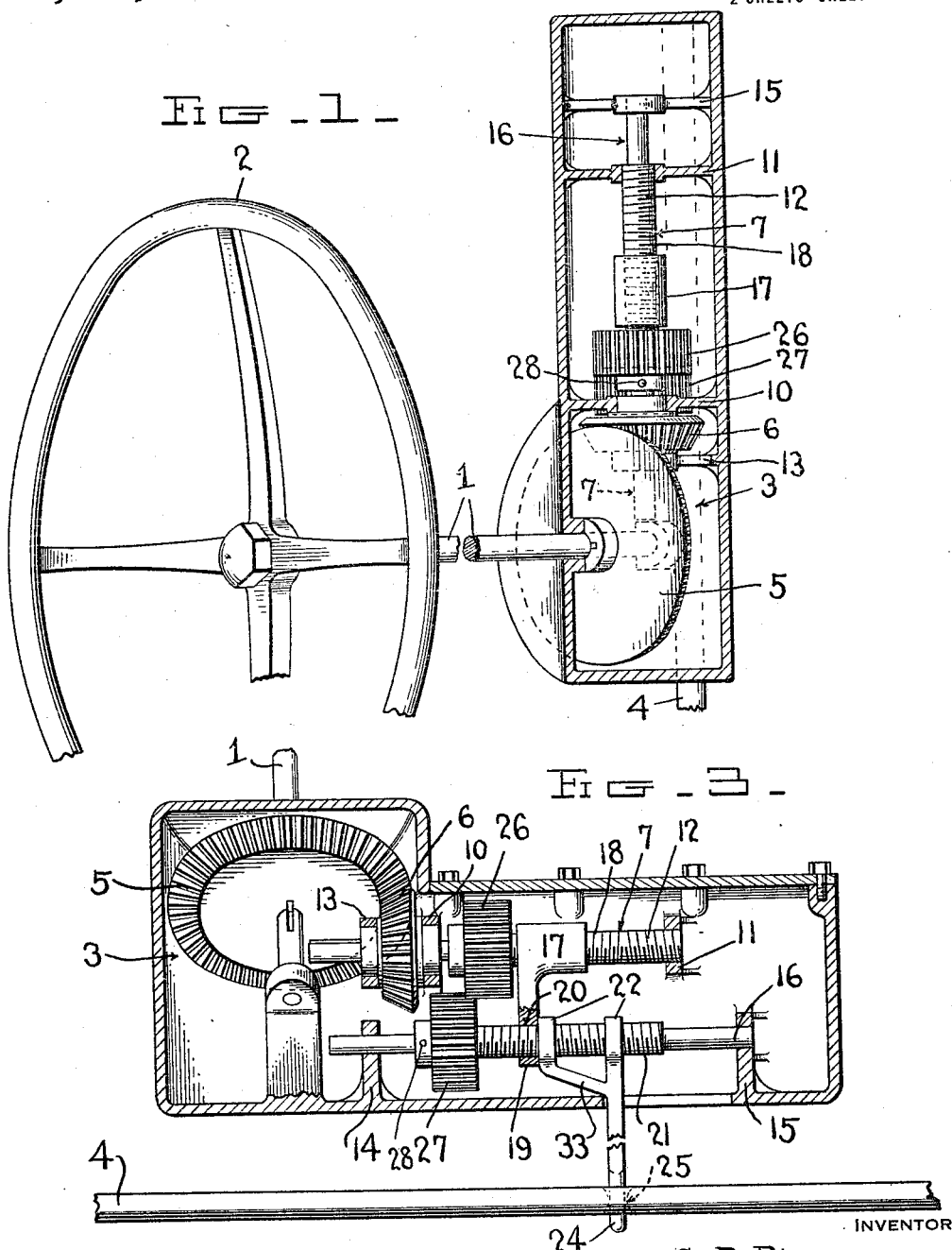

UNITED STATES PATENT OFFICE.

SWAN P. PIERSON, OF MILFORD, MASSACHUSETTS.

AUTOMOBILE STEERING-GEAR.

1,272,085.   Specification of Letters Patent.   Patented July 9, 1918.

Application filed August 10, 1917. Serial No. 185,538.

*To all whom it may concern:*

Be it known that I, SWAN P. PIERSON, a citizen of the United States, residing at Milford, in the county of Worcester and State of Massachusetts, have invented new and useful Improvements in Automobile Steering-Gears, of which the following is a specification.

This invention relates to automobile steering gear, the broad object in view being to produce a steering gear which is irreversible but of a simpler and cheaper character than the ordinary irreversible steering gear now in common use as applied to motor vehicles.

A further object of the invention is to produce steering mechanism of such a character that the ratio of throw between the final element of the steering gear and the initial element thereof, may be changed by the manufacturer to suit the particular type of vehicle in connection with which the steering mechanism is used.

It will be evident as the description proceeds, that the steering gear herein shown and described is capable of various uses for the purpose of steering vehicles or craft of all kinds, being particularly valuable for steering automobiles, aircraft and watercraft.

With the above and other objects in view, the invention consists in the novel construction, combination and arrangement of parts, herein described, illustrated and claimed.

In the accompanying drawings:—

Figure 1 is a plan view of the improved steering gear, showing the position assumed by the parts when turning to the left.

Fig. 2 is a similar view showing the position of the parts when making a right hand turn.

Fig. 3 is a vertical sectional view taken about in line with the primary feed screw.

Fig. 4 is a vertical sectional view taken in line with the secondary feed screw.

Referring to the drawings 1 designates the primary element of the steering mechanism, the same being shown as constituting the steering shaft of a motor vehicle and having fast thereon the usual hand controlling wheel 2. 3 designates the final member of the improved steering mechanism which is operatively associated with the knuckle arm connecting rod 4 found upon nearly all motor vehicles of the present day type.

In carrying out the present invention, the steering shaft 1 has fast thereon a bevel gear 5 which meshes with and actuates a pinion 6, the latter being feathered to what is hereinafter termed a primary feed screw 7. The feed screw 7 is formed with a longitudinal groove or key-way 8 which receives a key 9 of the bevel pinion 6, the construction referred to enabling the feed screw 7 to move in the direction of its length. For that purpose, the primary feed screw 7 is rotatably and slidably mounted in suitable combined guiding and bearing members 10 and 11 arranged adjacent to opposite ends of said primary feed screw. The member 11 is internally threaded and engages a right hand thread 12 on the adjacent end of the feed screw 7. The opposite end portion of the feed screw 7 is smooth and unthreaded and merely rotates within and slides through the member 10. The pinion 6 is held against moving with the feed screw 7 by means of stops 13.

Mounted in suitable combined guiding and bearing members 14 and 15 is a secondary feed screw 16 both end portions of which are smooth and unthreaded and freely slidable through the members 14 and 15 as well as rotatable therein. 17 designates a primary runner which is formed with an internal left hand thread to engage a left hand thread 18 on the primary feed screw 7. The runner 17 comprises an arm 19 with an internal left hand thread to engage a left hand thread 20 on the secondary feed screw 16. Said secondary feed screw is also formed with a right hand thread 21 where it passes through the spaced arms 22 of a secondary runner 33. The last named runner has a projecting tongue 24 which is positioned in a socket 25 in the connecting rod 4. Motion is transmitted from the primary feed screw 7 to the secondary feed screw 16 by gears 26 and 27 secured to their respective screws by fastening means 28. The gears 26 and 27 are of the broad faced type as they have to slide laterally with relation to each other or in planes parallel to the axes of the primary and secondary feed screws which as above indicated are parallel to each other and each of which is movable in the direction of its length.

From the foregoing description taken in connection with the accompanying drawings, it will now be understood that by turning the shaft 1, rotary motion is imparted to the primary feed screw and as the latter has a threaded connection with the guiding and bearing member 11, said primary feed screw is caused to move in the direction of its length thereby shifting the primary runner 17 in the said direction. By means of the gears 26 and 27, rotary motion is simultaneously transmitted to the secondary feed screw and as the arm 17 of the primary runner has a threaded engagement with said secondary feed screw, the latter is caused to move in the direction of its length, and in the same direction as the primary feed screw. As the secondary runner 33 has a threaded engagement with the secondary feed screw, it is simultaneously shifted in the same direction as said secondary feed screw but at a greater speed. It will be understood that the primary feed screw in moving in one direction causes an accelerated movement of the primary runner in the same direction. The primary runner actuates the secondary feed screw in the same direction at an accelerated speed and said secondary feed screw actuates the secondary runner in the same direction at a still further accelerated speed. The runners cannot actuate the feed screws and the steering mechanism is therefore rendered irreversible.

I do not wish to be limited to the use of two feed screws and two runners as a third or fourth or more feed screws and runners may be added to the mechanism to still further accelerate the speed of the final member 33 of the steering mechanism.

I claim:

1. Irreversible steering gear comprising in connection with an initial actuating member and a final actuated member in the form of a runner, a rotary and longitudinally movable feed screw, a fixed member with which said screw has a threaded connection, a rotatable and longitudinally movable secondary feed screw, means for imparting rotary motion from one feed screw to the other, and a primary runner having a threaded connection with both feed screws actuated by one screw and actuating the other screw, said secondary runner having a threaded engagement with the secondary feed screw.

2. In steering gear, the combination of an initial rotary actuating member, a final reciprocatory actuated member consisting of a final runner, a rotary and longitudinally movable primary feed screw geared to said initial actuating member, a stationary member with which said primary feed screw has a right hand threaded engagement, a rotary and longitudinally movable final feed screw, means for transmitting rotary motion from one of said feed screws to the other, and a primary runner having a left hand threaded engagement with the primary feed screw and a left hand threaded engagement with the final feed screw, said final actuated element or secondary runner having a right hand threaded engagement with said final feed screw.

3. In steering gear, the combination of an initial rotary actuating member, a final reciprocatory actuated member consisting of a final runner, a rotary and longitudinally movable primary feed screw geared to said initial actuating member, a stationary member with which said primary feed screw has a right hand threaded engagement, a rotary and longitudinally movable final feed screw, means for transmitting rotary motion from one of said feed screws to the other, a primary runner having a left hand threaded engagement with the primary feed screw and a left hand threaded engagement with the final feed screw, said final actuated element or secondary runner having a right hand threaded engagement with said final feed screw, and a steering knuckle arm actuating rod with which said secondary runner has a tongue and socket connection.

In testimony whereof I affix my signature.

SWAN P. PIERSON.

Copies of this patent may be obtained for five cents each, by addressing the "Commissioner of Patents, Washington, D. C."